United States Patent
Staudenmayer

[15] 3,699,824
[45] Oct. 24, 1972

[54] ENERGY ABSORBING STEERING COLUMN FOR A MOTOR VEHICLE

[72] Inventor: Karl Staudenmayer, Cologne Weidenpesch, Germany

[73] Assignee: Ford Motor Company, Dearborn, Mich.

[22] Filed: April 5, 1971

[21] Appl. No.: 131,441

Related U.S. Application Data

[63] Continuation of Ser. No. 850,360, Aug. 15, 1969, abandoned.

[52] U.S. Cl....................................................74/492
[51] Int. Cl. ..............................................B62d 1/18
[58] Field of Search...............................74/492, 493

[56] References Cited

UNITED STATES PATENTS 3,373,629   3/1968   Wight et al. ..................74/492
3,459,063   8/1969   Numazawa ...................74/492
3,486,396   12/1969  Yoshioka et al. ............74/492
3,504,567   4/1970   Ohashi et al. ................74/492
3,479,902   11/1969  Okamoto......................74/492

Primary Examiner—Milton Kaufman
Attorney—John R. Faulkner and Clifford L. Sadler

[57] ABSTRACT

An energy absorbing steering column for a motor vehicle having a pair of telescopic steering shaft sections and a pair of telescopic tubular sections that form an outer housing. The tubular sections are separated by a plurality of prestressed elastomeric members that are compressed when the column is collapsed whereby energy is absorbed.

8 Claims, 3 Drawing Figures

PATENTED OCT 24 1972 3,699,824

INVENTOR
KARL STAUDENMAYER
BY John R. Faulkner
Clifford L. Sadler
ATTORNEYS

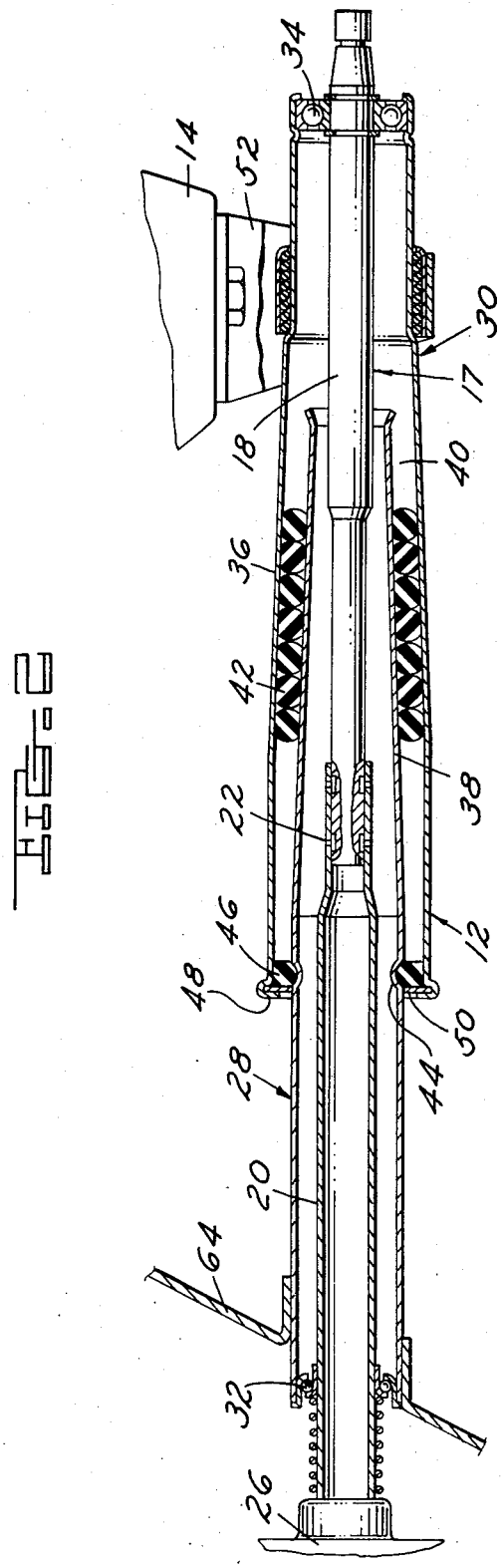

3,699,824

ENERGY ABSORBING STEERING COLUMN FOR A MOTOR VEHICLE

This application is a continuation of application Ser. No. 850,360 filed Aug. 15, 1969 and now abandoned.

BACKGROUND OF THE DISCLOSURE

The present invention relates to a steering column for a motor vehicle of the type that is constructed to collapse and absorb energy. An outer tube located concentrically of a telescopically collapsible steering shaft is secured to the fire wall and to the instrument panel of the vehicle. The outer tube, when subjected to axial impact, is constructed to collapse and absorb an increasing degree of energy as it does so.

Steering columns exhibiting the aforementioned characteristics are already known. Usually they have an outer tube that is deformable plastically upon impact to thereby absorb energy. In one type, the energy absorption is not smooth, but rather, progresses in abrupt stages as selected portions of the outer tube are plastically deformed. In addition, steering columns of the deformable type do not have adequate bending strength and are subject to instability when stressed under a bending load.

BRIEF SUMMARY OF THE DISCLOSURE

It is the principal object of the present invention to create an energy absorbing steering column for motor vehicles in which the drawbacks of the known steering columns are avoided.

In accordance with the presently preferred embodiment of this invention, an energy absorbing steering column is provided having telescopic steering shaft sections and telescopic outer tubular housing members. The outer members have tapered portions that are in overlapping relationship. Between the tapered portions, there is a conical inter-space of uniform width. A series of elastomeric rings are fitted into the interspace and held in prestressed condition.

The upper end of the upper tube is fitted within a collar supported on the instrument panel. A series of elastomeric rings or tori is situated between the upper tubular member and the collar. Another series of annular elastomeric members or tori member is used to maintain the relative axial position of the two outer members.

With this construction, an energy absorbing steering column is provided having substantial rigidity during normal usage. Upon impact in an axial direction against the upper end of the steering shaft, the outer tubular members will be displaced against the resiliency of the rings compressed between the two housing members and the outer housing will become axially displaced from the collar supporting it on the instrument panel.

In the event of an axial impact against the lower end of the steering column assembly, the tubular housing members will be displaced with respect to each other against the compression of the elastomeric rings therebetween. The bracket supporting the column assembly at the instrument panel will prevent the upper housing from being displaced rearwardly.

This construction has the advantage that energy is absorbed in a progressively increasing manner as the elastomeric rings between the housing sections are radially deformed.

BRIEF DESCRIPTION OF THE DRAWINGS

The many objects and advantages of the present invention will become apparent from the following description and the accompanying drawings in which:

FIG. 2 is a sectional view of the steering column of FIG. 1; and

Referring now to the drawings for a more complete understanding of this invention, FIG. 1 illustrates a vehicle body 10 having an energy absorbing steering column 12 supported by the instrument panel 14 and the fire wall 16 portions of the body 10.

As seen in FIG. 2, the energy absorbing steering column assembly 12 includes a steering shaft assembly 17 having an upper steering shaft section 18 and a lower steering shaft section 20 that are interconnected by means of shear pins 22. The upper steering shaft 18 is connected to a steering wheel 24. A flexible coupling 26 joins the lower shaft 20 to the steering gear. The steering shaft assembly 17 is rotatably supported within a housing assembly that includes a lower tubular housing member 28 and an upper tubular housing member 30. A ball bearing 32 is interposed between the lower housing member 28 and the lower steering shaft 20. Similarly, a ball bearing 34 is situated between the upper end of the upper steering shaft section 18 and the upper tubular housing section 30.

Figure 1:
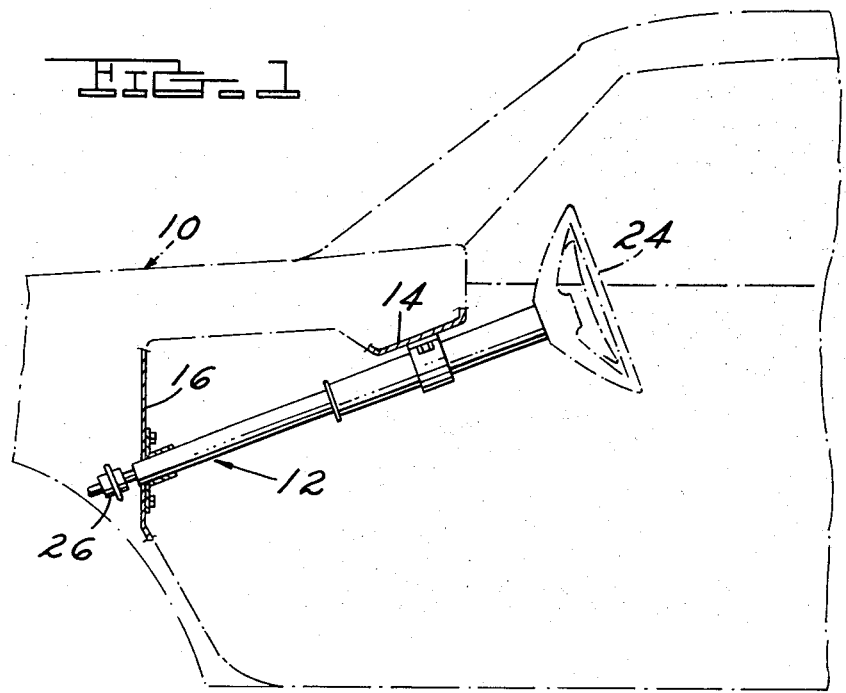
FIG. 1 is a side elevational view of a portion of a motor vehicle having an energy absorbing steering column constructed in accordance with this invention.

As observed in FIG. 2, the housing sections 28 and 30 are arranged in overlapping telescopic relationship. The upper housing 30 has an intermediate tapered portion 36 radially spaced apart from a tapered portion 38 formed on the lower housing 28. The inter-space 40 between the two tapered sections 36 and 38 is frusto-conical in configuration and of constant thickness. A series of elastomeric rings 42 or tori interposed between the tapered sections 36 and 38 in the interspace 40. In the fully assembled condition of the energy absorbing steering column, the rings 42 are prestressed.

Means are provided to maintain the relative axial position of the housing sections 28 and 30. For this purpose, an annular groove 44 is formed in the lower housing 28 and a large rubber ring 46 is seated in the groove 44. The lower end of the housing 30 has a turned over flange 48 which positions a snap ring 50 against the ring 46. The ring 46 is held in compression and due to its being seated in groove 44 and against snap ring 50, it prevents axial displacement between the two outer housing members 28 and 30.

A bracket 52 is bolted to the instrument panel 14. The bracket 52 supports a collar 54 that surrounds the upper end of the housing member 30. A series of prestressed elastomeric rings or tori 56 is positioned between the collar 54 and the reduced diameter upper end portion 58 of the housing 30. As will be observed in FIG. 3, the collar 54 has an inwardly turned flange 60 at its end adjacent the steering wheel 24. A shoulder 62 is formed on the housing 30 adjacent the lower end of the collar 54.

Figure 3:
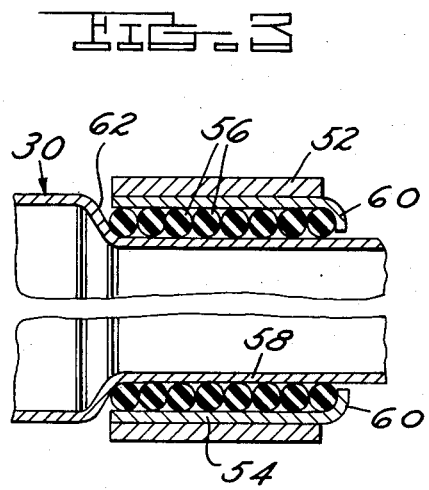
FIG. 3 is an enlarged sectional view of the support structure for the upper column section.

This structure functions as a "one-way" support bracket. In the event of a force against the steering wheel tending to cause displacement of the housing 30 to the left (as seen in FIG. 3), the rings 56 will provide only nominal resistance to such displacement. In the event of a force causing displacement of the housing 30 to the right, however, the rings 56 will become compressed and the shoulder 62 will engage the bracket 52. This construction will prevent axial displacement of the steering column in a rearward direction.

A flange 64 is welded to the lower end of the housing portion 28 and it, in turn, is bolted to the fire wall 16.

OPERATION

In the event of an impact against the steering wheel in a forward direction that is above a present amount, the shear pins 22 will be fractured and the ring 46 will be disengaged from the groove 44. The upper housing section 30 will be displaced to the left (as seen in FIG. 2) relative to the bracket 52. The lower steering column section 28 is supported on the fire wall and will not be displaced. Therefore, relative displacement between the tapered tubular housing sections 28 and 30 will progressively close the frusto-conical gap between the tapered sections 28 and 30 whereby the rubber elements or tori 42 to be progressively compressed and to thereby absorb energy.

In the event of an impact upon the lower end of the steering column assembly, the upper housing 30 will be supported against rearward displacement by the support structure illustrated in FIGS. 2 and 3 which includes the rubber tori 56. The rubber ring 46 will be displaced from the groove 44 and the resilient elements or tori 42 will be compressed radially and energy will thereby be absorbed.

A steering column according to this invention has the advantage that rubber is used to absorb the energy of an impact rather than the plastic deformation of metal parts. The construction is unique in that even though elastomeric members are used to absorb the energy, there is no significant rebound effect after the impact.

The foregoing description presents the presently preferred embodiment of this invention. Modifications and alterations may occur to those skilled in the art that will come within the scope and spirit of the invention.

I claim:

1. An energy absorbing steering assembly for a motor vehicle having a steering shaft assembly and a supporting housing assembly, said shaft assembly being constructed to be connected to a steering wheel at one of its ends and to a steering gear at the other of its ends, said steering shaft assembly being rotatably supported in said housing assembly, said housing assembly including first and second tubular housing parts, said housing parts being constructed to be connected to the support structure of said vehicle, said housing parts having tapered overlapping portions, said overlapping portions defining a generally frusto-conical interspace of substantially uniform thickness, a plurality of juxtaposed elastomeric tori positioned between said tapered housing portions in said interspace, said housing assembly being constructed to progressively stress said elastomeric tori in radial compression upon relative axial displacement of said housing parts.

2. An energy absorbing steering assembly for a motor vehicle according to claim 1 and including:

means constructed to support the rearward of said housing parts against rearward displacement when subjected to a substantial force in one direction while permitting forward displacement of said rearward housing part when subjected to a lesser force in the opposite direction.

3. An energy absorbing steering assembly for a motor vehicle according to claim 1 and including:

said steering shaft assembly including first and second shaft parts drivingly interconnected and secured against relative axial displacement by frangible means, means constructed to maintain said housing parts in fixed relative axial position during normal operation, means constructed to support the rearward of said housing parts against rearward displacement when subjected to a substantial force in one direction while permitting forward displacement of said rearward housing part when subjected to a lesser force in the opposite direction.

4. An energy absorbing steering assembly for a motor vehicle having a steering shaft assembly and a supporting housing assembly, said shaft assembly being constructed to be connected to a steering wheel at one of its ends and to a steering gear at the other of its ends, said steering shaft assembly being rotatably supported in said housing assembly, said housing assembly including first and second tubular housing parts, said housing parts being constructed to be connected to the support structure of said vehicle, said housing parts having overlapping and spaced apart portions, a plurality of juxtaposed elastomeric tori positioned between said housing portions, said housing assembly having means constructed to progressively stress said elastomeric tori in compression upon relative axial displacement of said housing parts.

5. An energy absorbing steering assembly for a motor vehicle according to claim 4 and including:

means constructed to support the rearward of said housing parts against rearward displacement when subjected to a substantial force in one direction while permitting forward displacement of said rearward housing part when subjected to a lesser force in the opposite direction.

6. An energy absorbing steering assembly for a motor vehicle according to claim 4 and including:

said steering shaft assembly including first and second shaft parts drivingly interconnected and secured against relative axial displacement by frangible means, means constructed to maintain said housing parts in fixed relative axial position during normal operation.

7. An energy absorbing steering assembly for a motor vehicle according to claim 4 and including:

said steering shaft assembly including first and second shaft parts drivingly interconnected and secured against relative axial displacement by frangible means, means constructed to maintain said housing parts in fixed relative axial position during normal operation, means constructed to support the rearward of said housing parts against rearward displacement when subjected to a substantial force in one direction while permitting forward displacement of said rearward housing part when subjected to a lesser force in the opposite direction.

8. An energy absorbing steering mechanism for a motor vehicle having a steering shaft assembly and a supporting housing assembly, said shaft assembly being constructed to be connected to a steering wheel at one of its ends and to a steering gear at the other of its ends, said steering shaft assembly including first and second shaft parts drivingly interconnected and secured against relative axial displacement by a frangible means, said steering shaft assembly being rotatably supported in said housing assembly, said housing assembly being connected to the support structure of said vehicle, and including a first and second tubular interconnected housing parts, means constructed to maintain said housing parts in fixed relative axial position during normal operation, said just-mentioned means including a resilient ring, a groove formed in one of said housing parts, a flange formed on the other of said housing parts, said ring being seated in said groove and adjacent said flange, said housing parts having tapered overlapping portions, said overlapping portions being spaced apart and defining a generally frusto-conical interspace of substantially uniform thickness, a plurality of juxtaposed elastomeric tori positioned between said tapered housing portions in said interspace, said assembly being constructed to progressively stress said elastomeric tori in radial compression upon relative axial displacement of said housing parts, means constructed to support the rearward of said housing parts against rearward displacement when subjected to a substantial force in one direction while permitting forward displacement of said rearward housing part when subjected to a lesser force in the opposite direction, said last-mentioned means including said support structure having an annular member surrounding one of said housing parts and spaced therefrom, said member and said one housing part defining an annular interspace, a plurality of elastomeric rings interposed between said annular member and said one housing part in said annular interspace, said annular member having a shoulder portion defining a rearward limit to said annular interspace, said one housing part having a shoulder defining a forward limit to said annular interspace.

* * * * *